Patented June 20, 1950

2,512,430

UNITED STATES PATENT OFFICE 2,512,430

WELDING ELECTRODE

Theodore E. Kihlgren, Berkeley Heights, N. J., assignor to The International Nickel Company, Inc., New York, N. Y., a corporation of Delaware No Drawing. Application August 3, 1949, Serial No. 108,420

9 Claims. (Cl. 219—8)

The present invention relates to a nickel base welding electrode and, more particularly, to a nickel alloy welding electrode especially suited for direct current operation in the production of welds on wrought nickel base alloys and on ferrous materials wherein the welds produced are virtually or completely free of weld porosity as determined by radiographic examination.

The new electrode of the present invention includes a special lime-fluorspar type of flux coating containing cryolite which importantly contributes to the superior welding results obtained. In addition it affords a hard and adherent coating suited for application to the core wire by production drying at relatively low temperatures of about 250° F. to about 400° F. and capable of producing completely sound welds without the customary requirement of a high temperature bake at about 500° F. or higher.

The electrode of the present invention is capable of producing ductile, single and multiple bead welds essentially free of hot cracking tendencies in addition to meeting the exacting requirements as to freedom from weld porosity. The weld deposit of the improved electrode is further of a character to possess high impact strength at sub-zero temperatures down to at least about minus 320° F. Importantly functioning to obtain these results, the novel electrode in its preferred form contains columbium and silicon in a definite and predetermined relationship to each other so that the fusion metal of the weld will have a columbium-silicon ratio exceeding a certain minimum value as disclosed in Kihlgren and Lacy, U. S. Patent No. 2,422,489, issued June 17, 1947. The incorporation of the columbium in the specific ratio to the silicon content is important in its effect in reducing the tendency or eliminating the tendency to weld hot cracking. The present electrode, having a modified flux coating as hereinafter described, offers important commercial and operational advantages including a pronounced reduction in the tendency toward and elimination of weld porosity as referred to and improved freedom from piping porosity as commonly encountered in the welding of light gauge sheet.

The advantages and improved properties as referred to, I have discovered are obtainable with a nickel base electrode core and preferably a core wire of a composition containing as its essential elements about 80% nickel, about 14% chromium and about 6% iron and provided with a lime-fluorspar type coating having an effective cryolite addition in a critical proportion to favorably influence weld soundness and in its preferred embodiment further incorporating columbium and titanium to reduce tendency toward weld hot cracking and to further enhance weld soundness.

The lime-fluorspar coating employs a relatively low and controlled carbonate content which is fairly insensitive to electrode drying procedure and particularly effective in the production of welds substantially free of gas porosity.

The present invention also contemplates the provision of a flux coated welding rod in which the flux is devoid of components and binder materials which would have a tendency to react with essential residual elements from the fusion. The flux is further devoid of ingredients which would introduce undesirable elements such as lead and sulfur into the fusion.

It is an object of the present invention to provide an electric arc welding electrode capable of producing sound welds devoid of gas porosity.

Another object of the invention is to provide an electric arc welding electrode particularly suited for D. C. operation in the production of sound welds which are virtually free of weld porosity as determined by radiographic examination.

The invention also contemplates providing a nickel base alloy welding electrode having a special lime-fluorspar flux coating having a critical or controlled carbonate content and containing cryolite in such proportions as to importantly contribute in obtaining sound welds virtually free of weld porosity as determined by radiographic examination.

It is a further object of the invention to provide a nickel base alloy welding electrode having a lime-fluorspar type of flux coating of relatively low calcium carbonate content and containing cryolite and also columbium for the production of welds free of gas porosity, having a reduced tendency to weld hot cracking and a high impact strength at sub-zero temperatures down to minus 320° F.

The present invention also contemplates the provision of a flux coated nickel base welding rod wherein the flux coating is of a lime-fluorspar type of relatively low calcium carbonate content and containing columbium and titanium in proportions effective to produce welds which are virtually free of gas porosity.

A further object of the invention is to provide a nickel base alloy welding electrode having a lime-fluorspar type of flux coating of relatively low calcium carbonate content and containing cryolite in such proportions as to be effective to produce a hard adherent flux coating which under conditions of conventional low temperature baking will produce a fusion weld of sound and ductile properties free of hot cracking tendencies and virtually free of weld porosity.

Other objects and advantages will become apparent from the following description of the illustrative examples hereinafter referred to.

Broadly stated the present invention contemplates the provision of a nickel base alloy welding rod having a special lime-fluorsar type flux coating of comparatively low calcium carbonate content and containing cryolite in proportions to favorably influence weld soundness and to be virtually free of weld porosity as determined by radiographic examination. It has been found that the addition of cryolite to lime-fluorspar type electrodes has a very favorable influence upon weld soundness and if sufficient cryolite is present (preferably in excess of 22%) welds of acceptable radiographic quality can be obtained in a D. C. welding operation. Moreover, these superior welding results are obtained using electrodes dried at temperatures not exceeding 400° F., which with the coating composition employed results in a hard adherent flux coating suited for out-of-position welding and eliminating the objectionable requirement of a high temperature bake. When at a level of 25% cryolite the calcium carbonate I have found should be kept below about 25% to insure adequate soundness. However, under the conditions of a cryolite addition of say about 40%, considerably greater amounts of calcium carbonate can be present, of the order of about 35%, without seriously affecting the weld quality. This offers an advantage since calcium carbonate has a beneficial effect upon arc stability and slag characteristics. There is further incorporated with the lime-fluorspar electrode coating containing cryolite, an addition of ferro-columbium and likewise ferro-titanium to be effective in reducing hot cracking tendencies and further to enhance the soundness of the weld produced therewith.

In the preferred embodiment of the present invention the columbium and titanium are introduced into the fusion entirely through the flux coating on the electrode core wire. The columbium may be introduced, however, partly through the flux coating and partly from a columbium content of the core wire or, in some instances, it may be introduced from the core wire alone. The welding electrode of the present invention preferably employs a core wire of nickel base alloy, such as the commercially 80%-14%-6% nickel-chromium-iron alloy sold under the trademark "Inconel." This core wire as has been pointed out in the prior Kihlgren-Lacy patent, U. S. Patent No. 2,422,489 referred to, in addition to beneficial residual elements concomitantly present, generally contains silicon as an impurity. Commercially, nickel-chromium-iron alloy weld metal of zero silicon content is unattainable since a small amount of silicon is always present either in the alloy itself or in the flux ingredients.

As has been pointed out in said prior patent the severity of the hot cracking tendencies increases with the silicon content and it has been found that the addition of columbium to the fusion contents could counteract the effect of the silicon and that by the provision of sufficient columbium to silicon ratio in the weld metal the hot cracking tendency can be eliminated. The minimum columbium to silicon ratio as encountered in the weld metal to eliminate hot cracking in the specific alloy referred to has been found to be about 4.5 to 1 but in practice this ratio is desirably maintained at about 5 or 6 to 1 in order to obtain a margin of safety.

In its preferred embodiment the welding electrode of the present improvement has a core wire of a composition substantially as shown in the following typical analysis:

TABLE A

*Core wire*

| Element | Percent |
|---|---|
| Nickel | 79.74 |
| Chromium | 14.10 |
| Iron | 5.68 |
| Aluminum | 0.13 |
| Titanium | 0.28 |
| Manganese | 0.13 |
| Copper | 0.08 |
| Silicon | 0.20 |
| Carbon | 0.04 |
| Sulfur | 0.007 |

When welding ferritic and stainless steels or high silicon content nickel-chromium-iron castings it may be desired to use a 2% columbium content addition to the core wire to provide the extra columbium to meet the columbium to silicon ratio required for fusion. It is further within the scope of the invention to use special nickel base chromium-iron alloy wire modified with significant quantities of titanium, aluminum, molybdenum or tantalum, for the obtaining of beneficial properties incident to their use.

In the production of the improved electrode the lime-fluorspar type of flux coating containing cryolite is desirably of the composition and range as given in the following Table I.

TABLE I

| Dry Flux | Parts by Weight | |
|---|---|---|
| | Preferred | Range |
| Electrode coating: | | |
| Calcium Carbonate | 24 | 15-35 |
| Calcium Fluoride | 22 | 30-0 |
| Cryolite | 25 | 20-45 |
| Ferro-50 Columbium | 20 | 5-30 |
| Ferro-40 Titanium | 6 | 1-10 |
| Bentonite | 3 | 2-5 |
| Binder: | | |
| Dextrine | 3 | 0.5-5.0 |
| Water | As required for extrudability | |

The flux coating as given above is desirably applied to the core wire by an extrusion process and dried on the surface of the wire by subjecting it to heating at about 250° F. to 450° F. which has been found with the flux coating composition as given to produce a hard and adherent coating having good out-of-position welding characteristics and which is further relatively insensitive to damage by normal handling.

The following combinations of core wire diameter and electrode outside diameters have been found suitable for the production of sound ductile welds free from weld hot cracking and virtually free of weld porosity.

| Diameter | Outside Diameter |
|---|---|
| Inches | Inches |
| 3/16 | .260 |
| 5/32 | .230 |
| 1/8 | .190 |
| 3/32 | .140 |
| .075 | .110 |

The results of tests are given in the following test examples, the data of which will give those skilled in the art a better understanding of the invention.

*Example 1*

An X-weld crack test was made using a core wire of the nominal composition as given in Table A, having a diameter of 1/8", having an outside diameter of .190", and having a flux coating of the preferred composition as given in Table I.

The X-weld crack test was made by forming a weld in which two 3-inch lengths or blocks of 1-inch square bars are joined along a 3-inch edge with a double V groove weld. The weld passes were laid in, two at a time, at alternate sides of the double V formed by the two blocks with sufficient time lapse between each pair of passes to permit the specimen to cool to below 100° F. During welding visual examination was made of each pass after it had been laid in to determine whether any gross cracking had occurred. After welding, the specimen was sectioned twice on planes perpendicular to the direction of welding, and the sectional surfaces of the weld were polished on a rubber-bonded, fine abrasive wheel, etched and examined under a binocular microscope for weld cracks.

As a result of the above test of Example 1 it was found that there were no cracks in the four cross sections examined.

*Example 2*

A welded joint 6 inches long was made on a 3/8 inch thick nickel-chromium-iron plate. The electrode employed consisted of a nickel base chromium-iron alloy core wire of the nominal composition as given in Table A coated with a dextrine bonded flux of the following composition:

| | Parts by weight |
|---|---|
| $CaCO_3$ | 19 |
| $CaF_2$ | 27 |
| $Na_3AlF_6$ | 25 |
| Fe-40 Ti | 6 |
| Fe-50 Cb | 20 |
| Bentonite | 3 |

The coated electrode was given a normal dry at from 250° F. to 275° F. Five passes were used in completing the welded joint, locating a re-strike in each pass. The results of radiographic examination and longitudinal bend tests were as follows:

X-ray examination—satisfactory; 1 small pore only, found in one re-strike; and
Bend test—36% elongation in free bend.

The foregoing tests indicated a degree of soundness and ductility of the weld fully satisfying all code requirements.

*Example 3*

A welded joint similar to Example 2 was made up using an electrode composed of a core of the nominal nickel-chromium-iron composition as hereinbefore given (Table A) and having a flux coating identical with that shown in the "preferred" column of Table I. The results of the tests of the weld produced were as follows:

X-ray examination—satisfactory, only two slight pores; and
Bend test—37% elongation in 1" (longitudinal bend); 48% elongation in 1/2" (longitudinal bend).

This test demonstrates further the ductility and soundness of the welded joints produced in accordance with the invention.

*Example 4*

In this test two butt joints were made on 1 inch thick plates of 8½% nickel steel using in one instance an electrode having a core wire substantially of the analysis of Table A and in the other instance a core wire of similar composition except for the inclusion of a 2% columbium addition. Each of the core wires had a flux coating corresponding to the "preferred" composition of Table A. In this test Charpy keyhole notch impact specimens were machined from the plate, and the impact strength at minus 320° F. was determined both in the weld and at the fusion zone. The results of this test are shown below wherein the welds "a" were made with the 2% columbium addition electrode core wire and the welds "b" were made with the unaltered core wire of the composition given in Table A.

TABLE II

| Weld | Temp. of Test | Impact Foot-pounds | | | |
|---|---|---|---|---|---|
| | | As Welded | | Stress Relieved | |
| | | Weld | Fusion Zone | Weld | Fusion Zone |
| | °F. | | | | |
| a | −320 | 32 | 18 | 30 | 26 |
| b | −320 | 34 | 28 | 32 | 26 |
| a | +70 | 27 | 20 | 29 | 32 |
| b | +70 | 30 | 32 | 32 | 32 |

As these tests demonstrate, all of the Charpy impact test values at minus 320° F. show satisfactory results and exceed the 15 foot-pound impact strength requirement of the American Society of Mechanical Engineers' Boiler Construction Code for Unfired Pressure Vessels, Sec. U142.

*Example 5*

In this test, designed to illustrate the performance of the improved welding electrode in the welding of thin sheets wherein the high rate of travel is generally conducive to the formation of "pipes" in the weld, a weld produced with the electrode of the present invention was found to be free of defects. In this weld electrodes of .075 inch diameter having a core of the composition of Table A and a coating of the "preferred" composition of Table I was employed in making a weld of .050 inch thick sheet metal of the nominal composition of Table A without backing. A welding current of 30 amperes was employed and the weld produced on being ground and polished was found to be free of defects.

The data obtained as a result of the welding tests as referred to demonstrates that the electrode of the present invention provides for a more successful D. C. welding operation wherein the fusion metal of the weld is virtually free of weld porosity. Moreover, the employment of the specific flux coating with the nickel base alloy core is beneficial in reducing tendency to weld hot cracking, has an attendant commercial advantage of providing a hard and adherent flux coating under comparatively low temperature drying conditions and is likewise advantageous in out-of-position welding operations. It further is effective in producing a better bead contour particularly in light gauge lap welds than electrodes of the prior art and tends to produce welds of satisfactorily low silicon content, an advantage in controlling weld hot cracking.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A welding electrode having a core wire of nickel base alloy and a flux coating upon the core wire, said flux coating containing by weight 24 parts calcium carbonate, 22 parts calcium fluoride, 25 parts cryolite, 20 parts ferro-50 columbium, 6 parts ferro-40 titanium, 3 parts bentonite and a water-dispersible binder, said electrode being characterized in its adaptation for forming weld deposits virtually free of gas porosity by a D. C. welding operation.

2. A welding electrode adapted for forming weld deposits substantially devoid of gas porosity and adapted for D. C. arc welding operation and having a core wire of nickel base alloy and a flux coating on the core wire, said flux coating containing by weight 24 parts calcium carbonate, 22 parts calcium fluoride, 25 parts cryolite, 20 parts ferro-50 columbium, 6 parts ferro-40 titanium, 3 parts bentonite and 3 parts dextrine.

3. A welding electrode having a core wire of nickel-chromium-iron alloy and a flux coating on the core wire, said flux coating containing by weight 24 parts calcium carbonate, 22 parts calcium fluoride, 25 parts cryolite, 20 parts ferro-50 columbium, 6 parts ferro-40 titanium, 3 parts bentonite and a water-dispersible binder and said electrode being characterized by being adapted for forming weld deposits virtually free of gas porosity in a D. C. arc welding operation.

4. A welding electrode adapted for forming weld deposits by a D. C. welding operation and characterized by being virtually free of gas porosity, said electrode having a core wire essentially of about 80% nickel, about 14% chromium, and about 6% iron and a flux coating on the core wire, said flux coating containing by weight 24 parts calcium carbonate, 22 parts calcium fluoride, 25 parts cryolite, 30 parts ferro-50 columbium, 6 parts ferro-40 titanium, 3 parts bentonite and a water-dispersible binder.

5. A welding electrode having a core wire of nickel base alloy and a flux coating upon the core wire, said flux coating containing by weight from 15 to 35 parts calcium carbonate, up to 30 parts calcium fluoride, from 20 to 45 parts cryolite, from 5 to 30 parts ferro-50 columbium, from 1 to 10 parts ferro-40 titanium, from 2 to 5 parts bentonite and a water-dispersible binder, said electrode being characterized in its adaptation for forming weld deposits virtually free of gas porosity by a D. C. welding operation.

6. A welding electrode adapted for forming weld deposits substantially devoid of gas porosity and adapted for D. C. arc welding operation and having a core wire of nickel base alloy and a flux coating on the core wire, said flux coating containing by weight from 15 to 35 parts calcium carbonate, up to 30 parts calcium fluoride, from 20 to 45 parts cryolite, from 5 to 30 parts ferro-50 columbium, from 1 to 10 parts ferro-40 titanium, from 2 to 5 parts bentonite and from .5 to 5.0 parts dextrine.

7. A welding electrode having a core wire of nickel-chromium-iron alloy and a flux coating on the core wire, said flux coating containing by weight from 15 to 35 parts calcium carbonate, up to 30 parts calcium fluoride, from 20 to 45 parts cryolite, from 5 to 30 parts ferro-50 columbium, from 1 to 10 parts ferro-40 titanium, from 2 to 5 parts bentonite and a water-dispersible binder and said electrode being characterized by being adapted for forming weld deposits virtually free of gas porosity in a D. C. arc welding operation.

8. A welding electrode adapted for forming weld deposits by a D. C. welding operation and characterized by being virtually free of gas porosity, said electrode having a core wire essentially of about 80% nickel, about 14% chromium, and about 6% iron and a flux coating on the core wire, said flux coating containing by weight from 15 to 35 parts calcium carbonate, up to 30 parts calcium fluoride, from 20 to 45 parts cryolite, from 5 to 30 parts ferro-50 columbium, from 1 to 10 parts ferro-40 titanium, from 2 to 5 parts bentonite and a water-dispersible binder.

9. A flux coating for welding rods having a core wire of nickel base alloy, said flux coating containing by weight from 15 to 35 parts calcium carbonate, up to 30 parts calcium fluoride, from 20 to 45 parts cryolite, from 5 to 30 parts ferro-50 columbium, from 1 to 10 parts ferro-40 titanium, from 2 to 5 parts bentonite and a water-dispersible binder.

THEODORE E. KIHLGREN.

REFERENCES CITED

The following references are of record in the file of this patent:

UNITED STATES PATENTS

| Number | Name | Date |
| --- | --- | --- |
| 2,422,489 | Kihlgren et al. | June 17, 1947 |
| 2,444,654 | Kihlgren | July 6, 1948 |

Certificate of Correction

Patent No. 2,512,430                           June 20, 1950

THEODORE E. KIHLGREN

It is hereby certified that error appears in the printed specification of the above numbered patent requiring correction as follows:

Column 4, Table I, for the heading "Dry Flux" read *Electrode Coating*; same table, first column thereof, line 56, for "Electrode coating" read *Dry Flux*; column 7, line 66, for "30 parts" read *20 parts*;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*